United States Patent [19]

Teramachi

[11] Patent Number: 5,380,099
[45] Date of Patent: Jan. 10, 1995

[54] LINEAR BEARING AND ITS PRODUCTION METHOD

[75] Inventor: Hiroshi Teramachi, Tokyo, Japan

[73] Assignee: THK Co., Ltd., Tokyo, Japan

[21] Appl. No.: 50,374

[22] PCT Filed: Sep. 17, 1992

[86] PCT No.: PCT/JP92/01186
§ 371 Date: Jul. 16, 1993
§ 102(e) Date: Jul. 16, 1993

[87] PCT Pub. No.: WO93/06377
PCT Pub. Date: Apr. 1, 1993

[30] Foreign Application Priority Data

Sep. 19, 1991 [JP] Japan ............................ 3-266962

[51] Int. Cl.⁶ ............................................. F16C 29/06
[52] U.S. Cl. ......................................................... 384/45
[58] Field of Search ............................ 384/45, 43, 44; 464/168

[56] References Cited

U.S. PATENT DOCUMENTS 5,076,713 12/1991 Morita ..................... 384/45
5,176,453 1/1993 Jacob ....................... 384/43

FOREIGN PATENT DOCUMENTS 61-79021 9/1984 Japan .
61-180016 2/1985 Japan .
2-261924 3/1989 Japan .

OTHER PUBLICATIONS

Japanese Laid-Open Utility Model Publication No. 2-14824, filed Jan. 30, 1990; with English abstract.
Japanese Laid-Open Utility Model Publication No. 2-43521, filed Mar. 26, 1990; with English abstract.
Japanese Laid-Open Utility Model Publication No. 3-48417, filed Oct. 16, 1991; with English abstract.

*Primary Examiner*—Lenard A. Footland
*Attorney, Agent, or Firm*—Armstrong, Westerman, Hattori, McLeland & Naughton

[57] ABSTRACT

It is an object of the present invention to provide a linear bearing which is easy to manufacture and has sufficient mechanical strength, and its production method. A slider 1 guides a table or other movable bodies along a rail 2 and includes a thin ball plate 6 in which load ball channels 61 are formed to move balls 5 therein, and a thin mounting plate 7 adapted to secure the movable body. A molding material 8 such as resin or die cast alloy is molded to insert the ball plate 6 and the mounting plate 7 thereinto. The rail 2 is made of a metallic material 2 whose surface is hardened to a predetermined level when subjected to plastic deformation. During plastic deformation, the ball channels 23 are hardened to a predetermined level.

4 Claims, 11 Drawing Sheets

LINEAR BEARING AND ITS PRODUCTION METHOD

TECHNICAL FIELD

The present invention relates to a linear bearing for guiding movable bodies such as tables for use in various machine tools or industrial robots along a straight bed or stationary element.

BACKGROUND ART

This kind of linear bearing comprises a rail having ball channels in which balls are moved and secured to a bed or stationary element, and a slider having load ball channels cooperating with the ball channels to sandwich a multiplicity of balls and adapted to guide a table or movable body along the rail.

The slider has a function such that the load of the movable body is applied directly thereto. Under the circumstances, if the slider is deformed, the movable body is displaced relative to the base to which the rail is mounted. This presents a problem that the movable body can not be guided accurately on a straight line. The slider body to which the movable body is secured must have high rigidity.

To this end, the slider conventionally has a slider body formed from a metal block made, for example, of bearing steel. The slider body is made by first cutting a rectangular metal block to a predetermined shape, then, forming nonload ball bores and tapping bolt holes for securement of a movable body, and finally, carburizing a portion of the slider body and cutting and lapping that portion of the slider body to form load ball channels.

However, where a slider body is made from a metal block made, for example, of bearing steel, such a metal block must be machined in various ways. This production method is thus cumbersome.

It is necessary to accurately and smoothly cut the slider body at a predetermined angle to form load ball channels. However, it is difficult to accurately contact a grinder or other cutting tools when the slider body has a complicated shape. This deteriorates the accuracy of load ball channels.

There is proposed a slider body made from materials other than metal block. A thin metal plate has load ball channels and is molded, at its outer periphery, of epoxy concrete or synthetic resin (see Japanese utility model publication No. 48417/91)

According to this proposal, load ball channels can be readily and accurately formed by pressing or ball burnishing the thin metal plate. Also, the slider body can readily be machined to a complicated shape. This slider body can be more economically made than those formed by machining metal blocks.

However, the proposed slider body is less in rigidity than those made from metal blocks since it is like a metal plate with load ball channels attached to a block made of synthetic resin. The slider body is thus susceptible to deformation or breakage when substantial load is exerted from a movable body.

A slider must have a mounting portion for securement of a movable body. Movable bodies have various shapes and are, therefore, secured to the slider in various ways. The mounting portion may be in the form, for example, of a flange as an extension of the slider. Under the circumstances, linear bearing manufacturers are required to provide sliders with various mounting portions to meet a user's need. Its manufacture is, however, rather cumbersome. Thus, there is a need for sliders which allow for ready securement of movable bodies in various ways and which are economical to manufacture.

Conventionally, a rail is formed by drawing a metal block to have a predetermined cross section, carburizing a portion of the metal block, and cutting or lapping that portion to form ball channels. This production method is as cumbersome as that of the slider. Another problem is that the surface of the rail where balls are moved is susceptible to cracking.

There has recently been proposed a rail which includes a thin metal plate in which ball channels are formed by press, and synthetic resin inserted within the metal plate (see Japanese laid-open utility model publication No. 43521/90). However, to give ball channels predetermined hardness, it is necessary to treat the metal plate with TUFFTRIDE or thermally treat the metal plate such as quenching to harden the surfaces of the ball channels on which balls are moved. This treatment is also cumbersome and does not improve the fragility of the surfaces on which balls are moved.

DISCLOSURE OF THE INVENTION

In view of these problems, it is an object of the present invention to provide a linear bearing which is easy to manufacture and has high mechanical strength, and its production method.

In order to achieve the object, the present invention provides a slider for a linear bearing which comprises a thin ball plate having load ball channels, and a thin mounting plate having mounting portions to which a movable body is secured, characterized in that the ball plate and the mounting plate are integrated together by molding a molding material such as resin or die cast alloy.

According to such technical means, the slider can be formed by injection or extrusion molding synthetic resin within which the ball plate and mounting plate are inserted, or by die casting an alluminum or zink alloy. This allows for ready production of the slider having various shapes such as an inclined C-shape or L-shape. The shape of the ball plate may thus be altered in response to the shapes of a slider. Also, the number and angle of load ball channels formed in the ball plate may be changed as necessary.

The mounting plate may take any shape so far as it has mounting portions to secure a table or other movable bodies. However, it is necessary for the mounting plate to have high rigidity according to its shape and material since the load of a movable body is applied locally to the mounting plate.

Further, nonload ball channels can be any means applicable to the existing linear bearings so far as it can bring balls up at ends of the load ball channels. In the present invention, for example, the slider includes nonload ball bores extending in parallel to the load ball channels. End caps may be attached to front and rear ends of the slider to provide a communication between the load ball channels and the nonload ball bores. Alternatively, ball tubes may be inserted in the slider to provide a communication between opposite ends of the load ball channels.

The present invention has for its purpose to reduce the number of production steps and the production cost. It is therefore preferable to form part of the nonload all channels during insert molding process.

The mounting plate is integrated in the slider by insert molding, but the molding material such as resin surrounds the mounting plate, only. The mounting may be separated from the slider when substantial load is exerted on the mounting plate. To more firmly integrate the mounting plate in the slider, an adhesive agent may be applied to the mounting plate prior to insert molding. Alternatively, the ball plate and the mounting plate may be projection welded or riveted together. However, the use of these means results in an increase in the number of production steps and is not preferable as the purpose of the present invention is to reduce the production cost.

Therefore, the mounting plate preferably has a fixed portion which is embedded in the molding material during insert molding. This results in a decrease in the number of production steps simply by changing the shape of the mounting plate. The fixed portion may be in the form of pawls provided at opposite ends of the mounting plate. Alernatively, recesses may be formed centrally in the mounting plate.

Where the mounting plate has a fixed portion, the fixed portion preferably has an axial length less than that of the ball plate or has through openings. This prevents separation of the molding material covering the fixed portion from the molding material surrounding the ball plate and thus ensures firm integration of the mounting plate with the ball plate.

The present invention also provides a rail for use in a linear bearing to achieve the foregoing object.

A first rail is made of a metallic material which has such a characteristic that its surface hardness is increased when subjected to plastic deformation. The ball channels have predetermined surface hardness when the rail is plastically deformed to a predetermined shape.

With these technical means, the rail is pressed or rolled to a predetermined shape where the rail is made from a thin metal plate. At that time, the surface of the ball channels is hardened to a predetermined level. The rail is drawn to a predetermined shape where the rail is made from a metal block. During drawing process, the surface of the ball channel is hardened to a predetermined level.

The surface hardness required for the ball channels may vary depending on the material of balls and the load to be exerted on the slider, but is normally at least $H_RC35$. With this production method, the greater the deformation during plastic deformation, the greater the hardness of the ball channel surface on which balls are moved. Thus, where the rail is made, for example, by drawing process, the surface hardness of the ball channels can be adjusted by changing the volume as drawn by a die.

The same production method is applicable to the ball plate of the slider. The surface of the load ball channels can be hardened to a predetermined level simply by pressing or rolling a thin metal plate to a predetermined shape.

To achieve the foregoing object, a second rail is made from a metal rod and includes ball channels which is subjected to quenching and subzero (or deep freezing) treatment.

With these technical means, the fragile metallic system is improved during quenching process to effectively prevent crack which may occur in the ball channels upon repeated application of loads.

12 is a front view of the end cap of the linear bearing according to the first embodiment.

Figure 10:
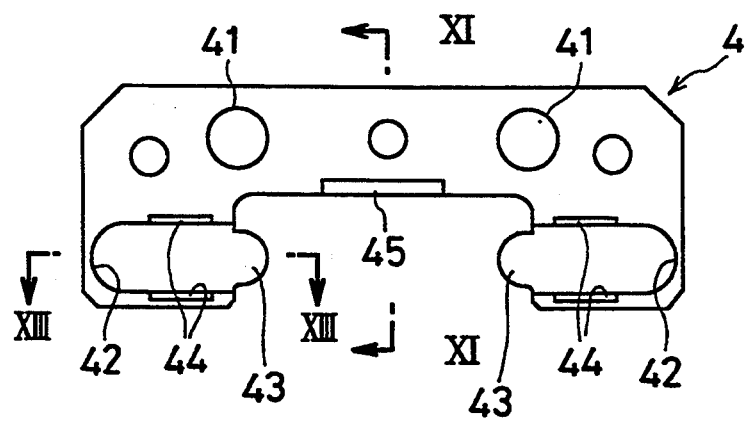
FIG. 10 is a rear view of the end cap of the linear bearing according to the first embodiment.
Figure 11:
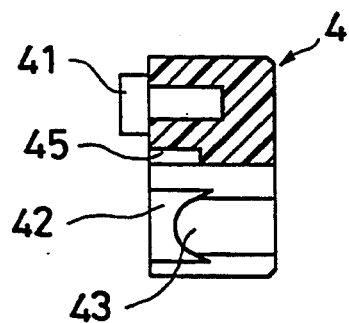
FIG. 11 is a sectional view taken along the line XI—XI of FIG. 10. FIG.
Figure 12:
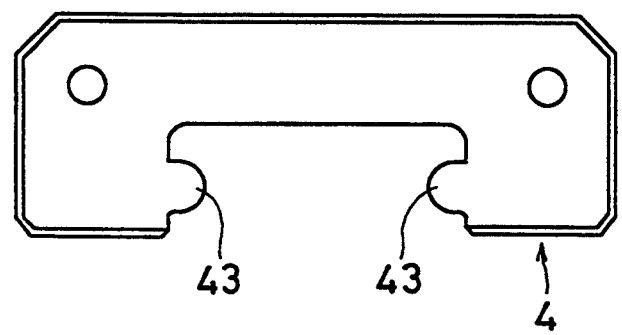
Figure 13:
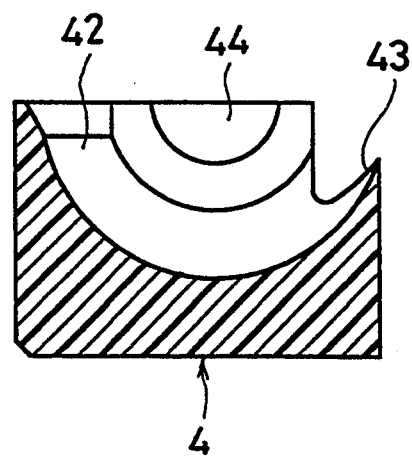

FIG. 13 is a sectional view taken along the line XIII—XIII of FIG. 10.

Figure 14:
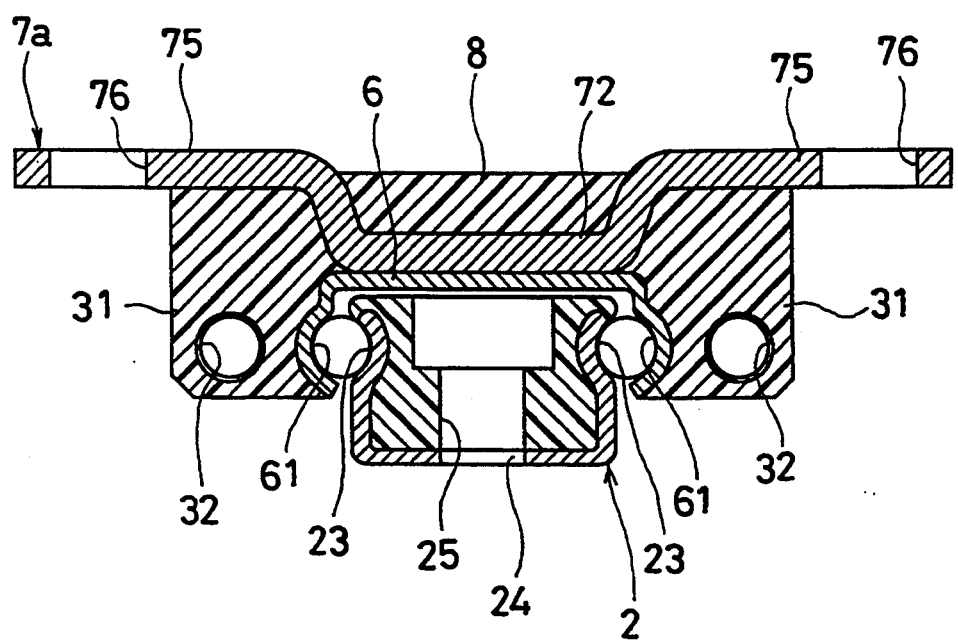

FIG. 14 is a sectional view showing a modified form of the slider of the linear bearing according to the first embodiment.

Figure 15:
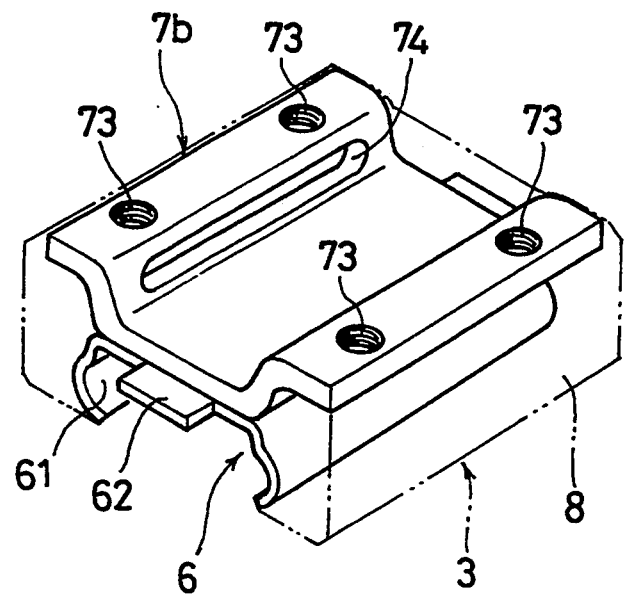

FIG. 15 is a perspective view of a linear bearing according to a second embodiment, part of which is taken away to show the structure of a slider.

Figure 16:
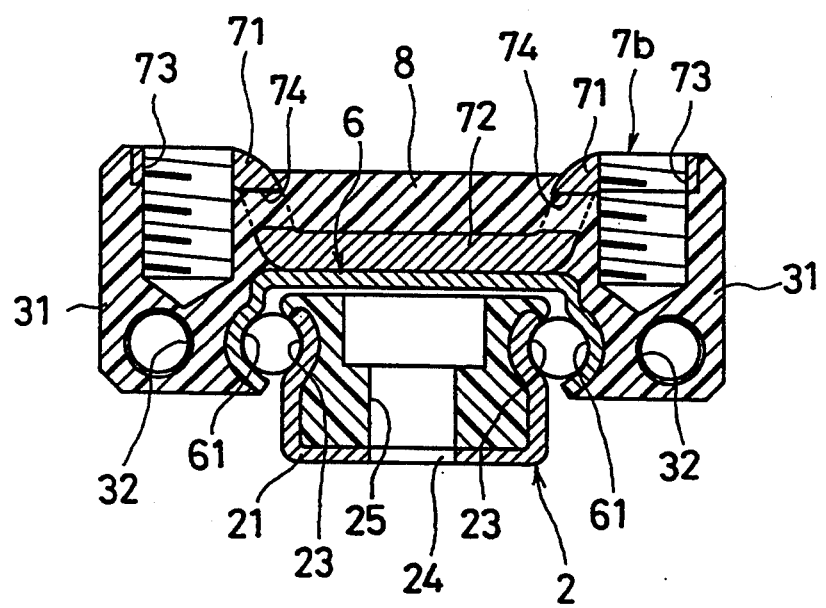

FIG. 16 is a sectional view of the linear bearing according to the second embodiment.

Figure 17:
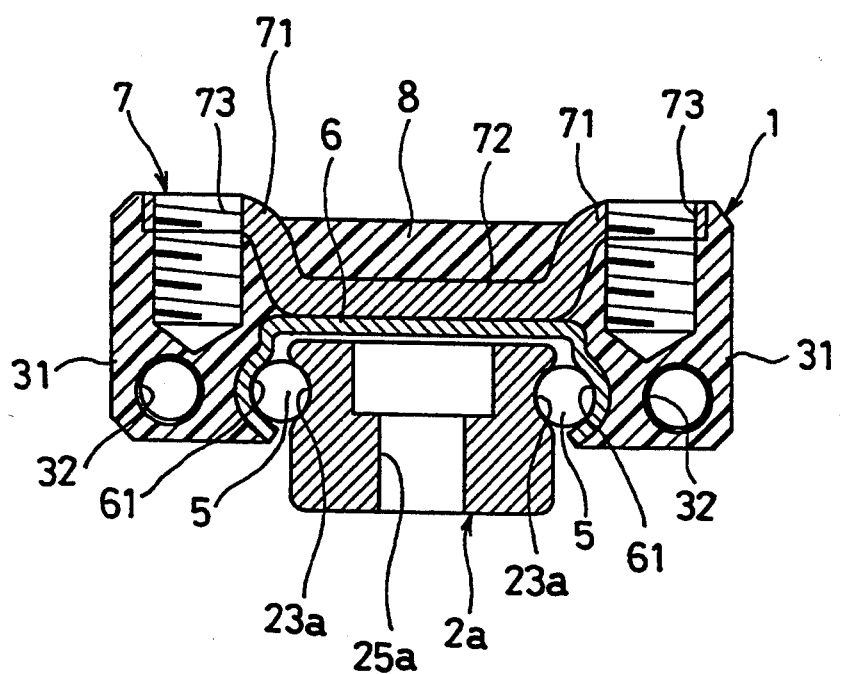

FIG. 17 is a sectional view of the linear bearing according to the first embodiment, showing a modified form of a rail.

BEST MODE FOR CARRYING OUT THE INVENTION

A linear bearing and its production method of the present invention will now be described with reference to the accompanying drawings.

Figure 1:
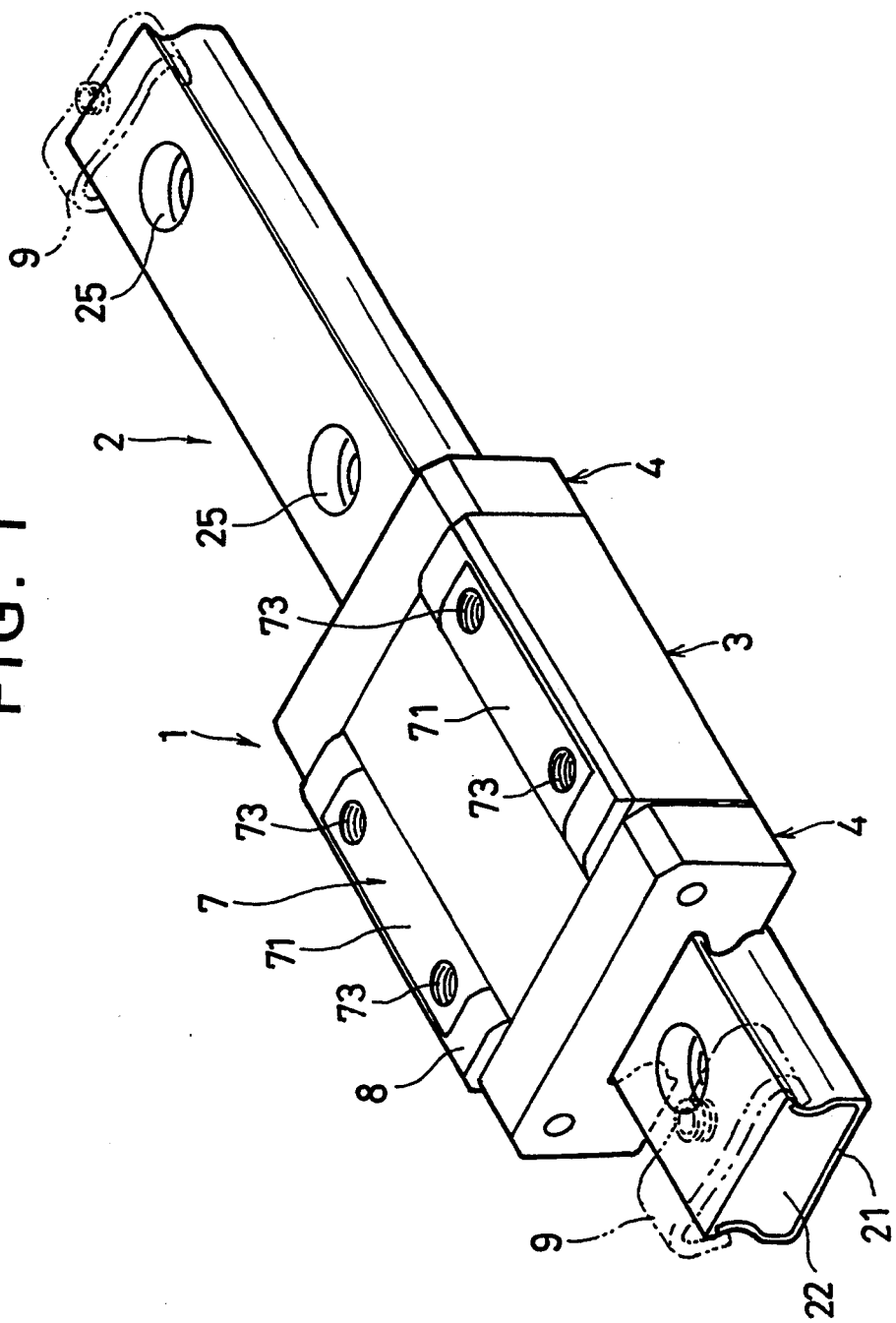
FIG. 1 is a perspective view of a linear bearing according to a first embodiment.
Figure 2:
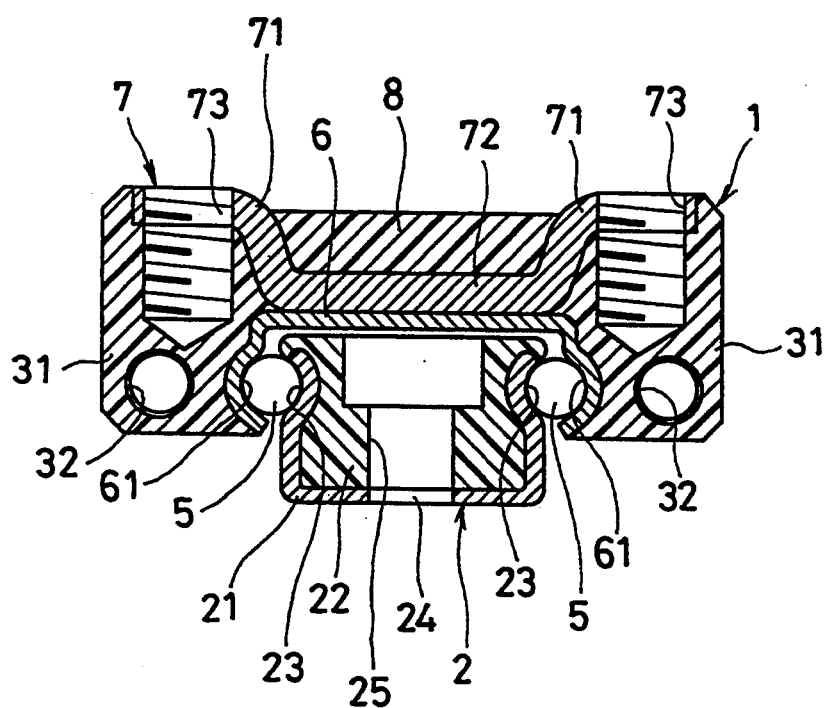
FIG. 2 is a sectional view of the linear bearing according to the first embodiment.
Figure 3:
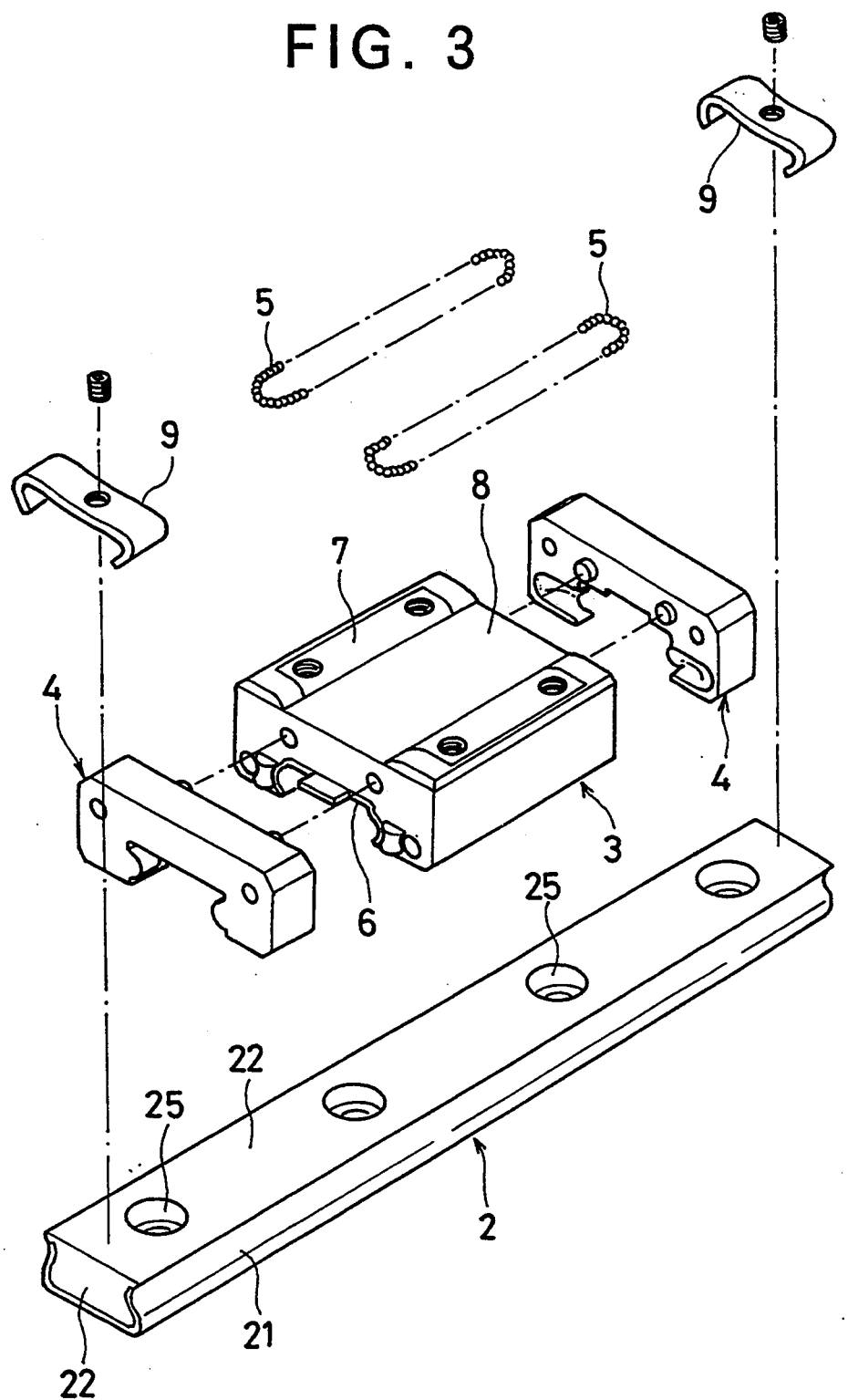
FIG. 3 is an exploded view, in perspective, of the linear bearing according to the first embodiment.

FIGS. 1 and 2 show a linear bearing according to a first embodiment of the present invention. The linear bearing generally includes a rail 2, and a slider 1 movable along the rail 2. FIG. 3 is a disassembled view of the slider 1 which includes a slider body 3 having a substantially inclined C-shape and extending over the rail 2, and a pair of end caps 4 coupled to front and rear ends of the slider body 3. The slider 1 is mounted on the rail through balls 5 which endlessly circulate in the slider 1.

Figure 4:
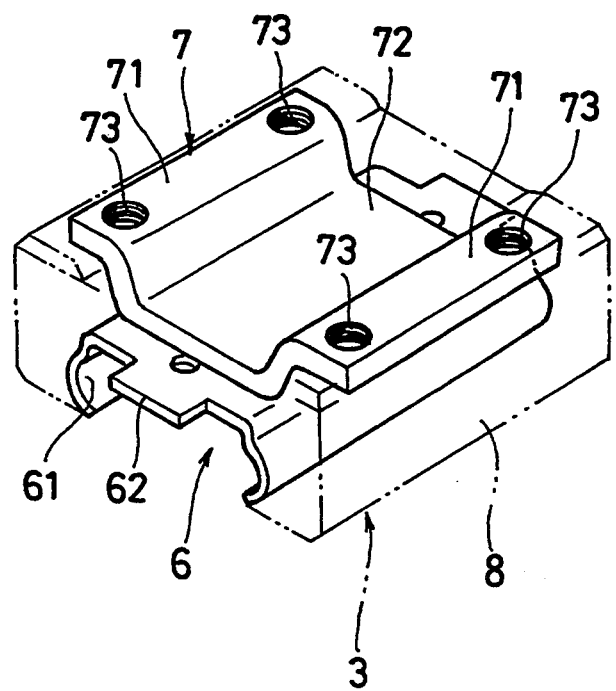
FIG. 4 is a perspective view of the linear bearing according to the first embodiment, part of which is taken away to show the structure of a slider body.
Figure 5:
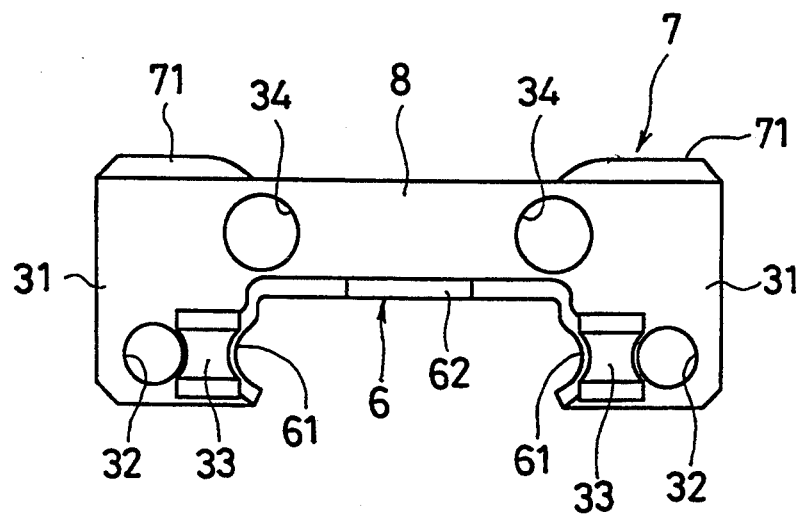
FIG. 5 is a front view of the slider body of the linear bearing according to the first embodiment.
Figure 6:
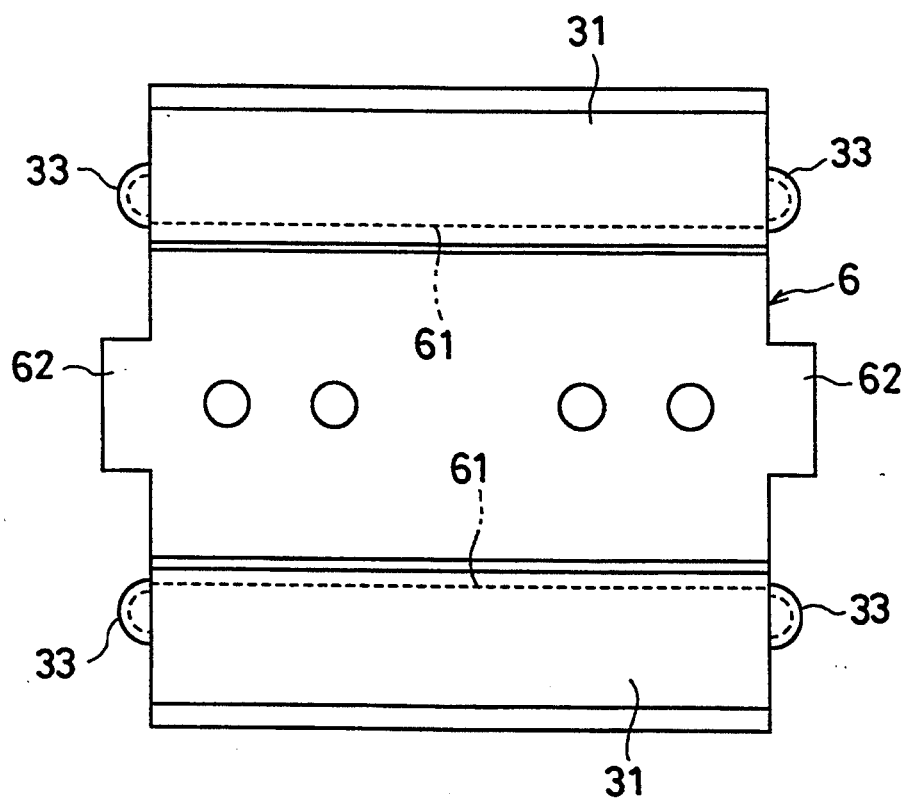
FIG. 6 is a bottom plan view of the slider body of the linear bearing according to the first embodiment.
Figure 7:
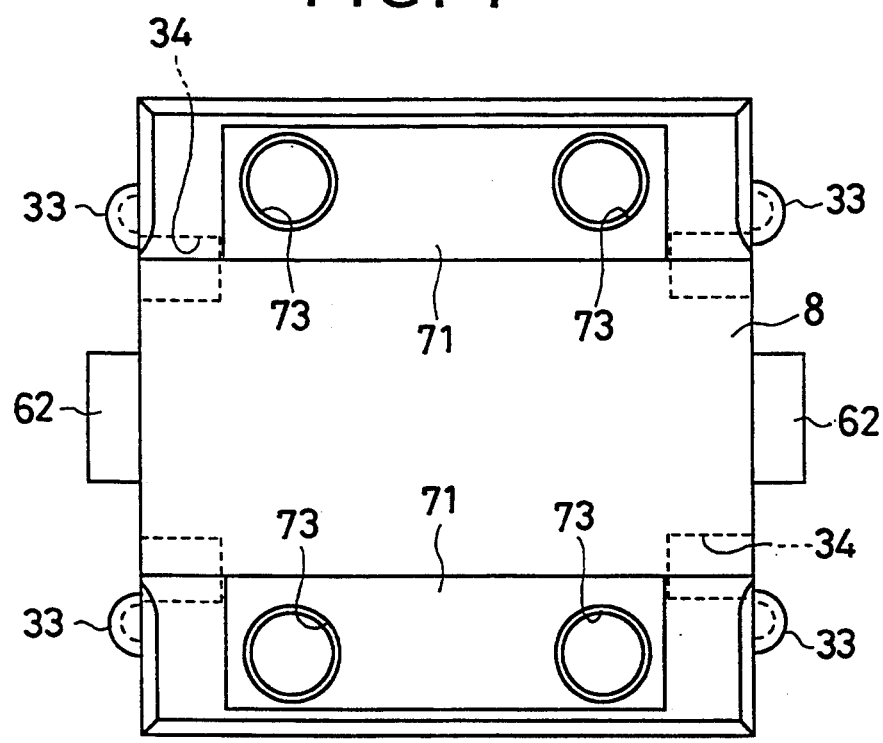
FIG. 7 is a top plan view of the slider body of the linear bearing according to the first embodiment.
Figure 8:
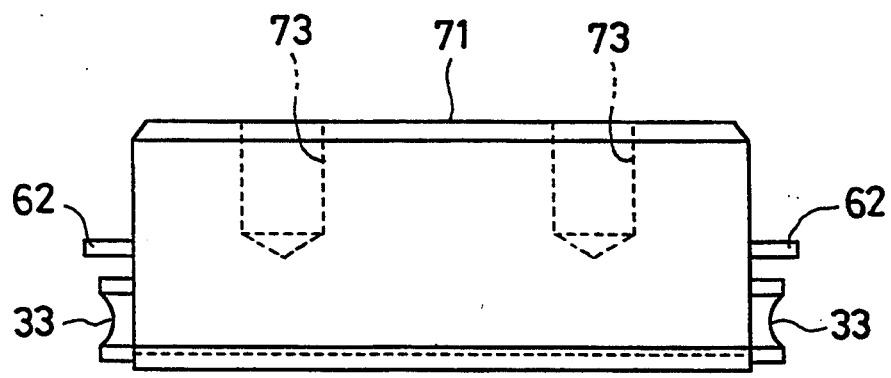
FIG. 8 is a side view of the slider body of the linear bearing according to the first embodiment.
Figure 9:
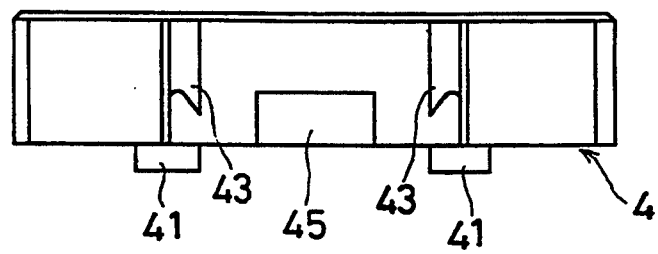
FIG. 9 is a bottom plan view of an end cap of the linear bearing according to the first embodiment.

As shown in FIG. 4, the slider body 3 includes a channel-like ball plate 6, and a mounting plate 7 having mounting portions 71 for mounting a movable body (not shown). The ball plate 6 and the mounting plate 7 are integrally formed together by a synthetic resin 8 (for example, TORAYCA).

The ball plate 6 is made of stainless steel or other metal (for exmple, SUS430) and shaped by a press. Opposite inner surfaces of the ball plate 6 form load ball channels 61 which cooperate with ball channels 23 of the rail 2 to sandwich the balls 5. Positioning projections 62 extend axially from opposite ends of the ball plate 6 to position the end caps. The load ball channels 61 are quenched and then, subzero treated. This treatment hardens the load ball channels 61 to increase its resistance to wear and stabilizes the metallic system of the load ball channels 61 to improve its fragility.

Alternatively, a metal sheet whose surface hardness can be increased when subjected to plastic deformation may be pressed or rolled to a predetermined shape. It is then plastically deformed to harden the surface of the load ball channels 61 to a predetermined level. Such a metal sheet which can be used in this process is, for example, austenite SUS304. The surface hardness of the load ball channels 61 is less than $H_RC10$ prior to pressing and increased to $H_RC35$ to 40 after it has been pressed. This method eliminates a need for heat treatment and results in lower production cost.

The mounting plate 7 is formed also by pressing a sheet metal made, for example, of stainless steel and having a thickness slightly greater than that used for the ball plate 6. The mounting plate 7 includes a recess or fixed portion 72 embedded in the synthetic resin 8 and located between a pair of mounting portions 71. The mounting portions 71 are tapped to form bolt holes 73 for threading engagement with bolts (not shown) of a movable body. The axial length of the mounting plate 7 is shorter than that of the ball plate.

The slider body 3 is formed by insert molding the ball plate 6 and the mounting plate 7. FIGS. 5 to 8 show the slider body 3 after it is insert molded.

As is clear from these figures, the ball plate 6 is wrapped by synthetic resin and is not separated from the slider body 3 in any direction. The mounting portions 71 of the mounting plate 7 extend outwardly from the surface of the slider body 3. The fixed portion 72 of the mounting plate 7 is embedded in the synthetic resin 8. The mounting plate 7 is thus not separated from the slider body 3 in any direction. During insert molding, part of nonload ball bores is defined in the slider body 3 to provide a connection between ends of the load ball channels to circulate the balls 2 therethrough. Specifically, the slider body 3 has legs 31 in which ball bores 32 through which nonload balls are moved are defined in parallel relationship to the load ball channels 61. Semicircular return guides 33 are formed in front and rear end surfaces of the slider body 3 to direct the balls 5 from the load ball channels 61 and the ball bores 32 and vice versa. Positioning holes 34 are defined during insert molding to receive projections 41 of the end caps 4.

The slider body 3 is formed substantially during the insert molding process. Finally, the mounting portions 71 of the mounting plate 7 which extend outwardly from the surface of the slider body 3 is abraded to provide a reference surface.

The end caps 4 coupled to front and rear ends of the slider body 3 are injection molded of synthetic resin. Semi-circular ball return channels 42 are formed in the inner sides of the end caps 4 and form part of the nonload ball channels. As shown in FIGS. 9 to 13, the ball return channels 42 provide a connection between the load ball channels 61 of the slider body 3 and the ball bores 32. Tongues 43 extend from ends of the end caps 4 to bring the balls 5 up from the load ball channels 61. Also, seats 44 are provided centrally in the ball return channels 42 to receive return guides 33 of the slider body 3 when the end caps 4 are coupled to the slider body 3. This facilitates guidance of the balls 5 through the ball return channels 42.

The end caps 42 are adhesively attached to the slider body 3. To ensure accurate attachment of the end caps 4 to the slider body 3, the end caps 4 have recesses 4 to receive projections 62 of the ball plate 6, and projections 41 to fit into the positioning holes 43 of the slider body 3.

As shown in FIGS. 2 and 3, the rail 2 includes a channel-like rail plate 21 made by pressing, and a synthetic resin 22 inserted in the rail plate 21 during molding process. A pair of ball channels 23 are formed in opposite outer sides of the rail plate 21 during pressing process. Also, through holes 24 are formed in the base along the length of the rail plate 21. Bolt holes 25 are formed during insert molding process and correspond to the through holes 24. In this embodiment, the slider 1 has no ball retainer. To avoid accidental removal of the slider 1 from the rail 2 and disengagement of the balls 5 from the load ball channels 61, stoppers 9 are attached to opposite ends of the rail 2.

The surface of the ball channels 23 are hardened to a predetermined level completely in the same manner as the load ball channels 61 of the ball plate 6. After the rail has been pressed, the ball channels 23 are quenched and then, subzero treated. Alternatively, a metal sheet made of austenite SUS304 may be pressed or rolled to a predetermined shape to thereby increase the surface hardness of the ball channels 23 to a predetermined level.

When the slider 1 is in use, the balls 5 are placed in the nonload ball channels composed of the ball return channels 42 of the end caps 4 and the ball bores 32 of the slider body 3. The balls 5 are also placed between the ball channels 23 of the rail 2 and the load ball channels 61 of the slider body 3. A movable body is then secured to the mounting portions 71 which extend outwardly from the upper surface of the slider 1.

A substantial part of the slider 1 is formed of synthetic resin 8. However, part of the mounting plate 7 which has high regidity is embedded in the synthetic resin 8 to be integral with the slider body 3. This mounting plate 7 serves as a reinforcing element for the slider body 3 to increase the rigidity of the slider body 3. Thus, the slider body 3 is free from deformation or breakage if substantial load is exerted.

The mounting plate 7 and the slider body 3 are integrally formed during insert molding of the slider 3. A change in shape of the mounting plate 7 results in a corresponding change in shape of the slider.

FIG. 14 shows a modification of the slider body 3 as insert molded. The slider body includes a mounting plate 7a which has wider mounting portions than those of the mounting plate 7, and bolt holes 76.

According to this embodiment, while the ball plate 6 and other elements are commonly used, a variety of mounting plates 7 can be employed to provide a variety of sliders. Thus, various types of sliders can economically and readily be fabricated according to user's need.

In the foregoing embodiment, the axial length of the mounting plate 7 is less than that of the ball plate 6 so that the synthetic resin 8 which covers the fixed portion 72 of the mounting plate 7 are safely joined to the synthetic resin 8 which surrounds the ball plate 6. As an alternative, the axial length of the mounting plate 6 may be identical to that of the slider body 3. In such a case, slots or through openings 74 may be formed in the fixed portion 72 as shown in FIG. 15.

FIG. 16 is a sectional view showing a second embodiment of the slider 1 wherein a mounting plate 7b has the through openings 74. As is clear from FIG. 16, the synthetic resin 8 which covers the fixed portion 72 of the mounting plate 7 through the through openings 74 is safely joined to the synthetic resin 8 which surrounds the ball plate 6. This embodiment also allows for firm integration of the mounting plate 7b with the slider body 3.

In this embodiment, the ball plate 6 is pressed, but the load ball channels 61 are not abraded. However, the load ball channels 61 may need be abraded when the plate 6 per se is made of a material which does not provide a smooth surface.

The rail 2 in which the slider 1 of this embodiment is assembled may be made by pressing a metal sheet. As shown in FIG. 17, a metal block may be drawn to form a rail 2a of a predetermined shape. In such a case, ball channels 23a of the rail 2a are quenched and then, subzero treated after it has been drawn so as to increase resistance to wear and improve the fragility of the ball channels 23a.

To reduce the cost of manufacturing the rail 2a, a block made of austenite SUS304 may be drawn to a predetermined shape. The rail 2a is plastically deformed to thereby increase the surface hardness of the ball channels 23a to a preetermined level.

INDUSTRIAL APPLICABILITY

As described above, according to a linear bearing and its production method of the present invention, a slider is formed by integrating a high rigid mounting plate with a ball plate by the use of molding material such as resin or die cast alloy. The slider thus made is highly rigid even if molding material is relatively flexible. It is therefore possible to provide a linear bearing which has high mechanical strength.

Also, according to a linear bearing and its production method of the present invention, a rail is plastically deformed to a predetermined shape to thereby harden a ball channels. This eliminates a need for heat treatment of the ball channels. It is therefore possible to provide a linear bearing which has high mechanical strength and is economical to manufacture.

Further, according to a linear bearing and its production method of the present invention, when a rail is quenched to harden ball channels, subzero treatment is subsequently effected to alter metallic system to improve the fragility of the rail. The ball channels are thus free from crack. It is therefore possible to provide a linear bearing which has high mechanical strength.

What is claimed is:

1. A linear bearing, comprising:
 a rail having ball channels; and
 a slider having load ball channels cooperating with said ball channels of said rail to sandwich a plurality of balls therebetween, in order to guide a movable body secured to said slider along a path of said rail, said slider including,
 (a) a ball plate in which said load ball channels are formed,
 (b) a mounting plate having mounting portions for supporting the movable body and a fixed portion connected to said mounting portions, and
 (c) a resin molding material at least partially surrounding said ball plate and said mounting plate, wherein said fixed portion of said mounting plate is embedded in said resin molding material.

2. A linear bearing according to claim 1, wherein said mounting plate has an axial length less than that of said ball plate.

3. A linear bearing according to claim 1, wherein said ball plate is made from a metal plate whose surface hardness is increased when subjected to plastic deformation, and said load ball channels are hardened to a predetermined level when said ball plate is plastically deformed to a predetermined shape.

4. A slider for a linear bearing, wherein the linear bearing includes a rail having ball channels, and a slider having load ball channels cooperating with the ball channels of the rail and to sandwich a plurality of balls therebetween, in order to guide a movable body secured to said slider along a path of the rail, said slider comprising:
 (a) a ball plate in which said load ball channels are formed,
 (b) a mounting plate having mounting portions for supporting the movable body and a fixed portion connected to said mounting portions, and
 (c) a resin molding material at least partially surrounding said ball plate and said mounting plate, wherein said fixed portion of said mounting plate is embedded in said resin molding material.

* * * * *